US008087139B2

(12) United States Patent
Tamamoto et al.

(10) Patent No.: US 8,087,139 B2
(45) Date of Patent: Jan. 3, 2012

(54) REPLACEMENT OF AIR CLEANER COVER

(75) Inventors: Ryuhei Tamamoto, Wako (JP); Hiroshi Moriyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 391 days.

(21) Appl. No.: 12/483,461

(22) Filed: Jun. 12, 2009

(65) Prior Publication Data

US 2009/0307890 A1 Dec. 17, 2009

(30) Foreign Application Priority Data

Jun. 12, 2008 (JP) ................................ 2008-154163

(51) Int. Cl.
*B23P 19/04* (2006.01)
*B21D 47/00* (2006.01)
*F01M 9/10* (2006.01)

(52) U.S. Cl. .................. 29/402.08; 29/897.1; 123/90.38

(58) Field of Classification Search ............... 29/402.08, 29/401.1, 402.11, 402.12, 402.14, 401.15, 29/402.17, 700, 717, 721, 754, 897.1, 897.2; 123/897.2, 90.38, 184.21
See application file for complete search history.

(56) References Cited

U.S. PATENT DOCUMENTS 6,890,366 B2 * 5/2005 Bugli et al. .................. 55/385.3
7,114,475 B2 * 10/2006 Vanderveen et al. ....... 123/90.38

FOREIGN PATENT DOCUMENTS

JP 2006-112359 A 4/2006

* cited by examiner

*Primary Examiner* — John C Hong

(74) *Attorney, Agent, or Firm* — Westerman, Hattori, Daniels & Adrian, LLP

(57) ABSTRACT

A cleaner cover replacing method includes the steps of detaching a first cleaner cover from a cleaner case; placing an attachment into fitted engagement with claw hooking parts of the cleaner case, placing a second cleaner cover on the cleaner case, and causing a bolt to pass through a bolt hole of the second cleaner cover and to threadedly engage with a nut part of the attachment.

3 Claims, 4 Drawing Sheets

REPLACEMENT OF AIR CLEANER COVER

FIELD OF THE INVENTION

The present invention relates generally to an air cleaner and, more particularly, to replacement of an air cleaner cover.

BACKGROUND OF THE INVENTION

An internal combustion engine is provided with an air cleaner apparatus for supplying clean air to a combustion chamber of the engine. Such an air cleaner apparatus is comprised of a cleaner case, a cover and a cleaner element enclosed by the cleaner case and the cover. A typical example of such an air cleaner apparatus is disclosed in Japanese Patent Application Laid-Open Publication No. 2006-112359 (JP 2006-112359 A). The disclosed air cleaner apparatus will be described in detail below with reference to FIGS. 4 and 5 hereof.

As shown in FIG. 4, an air cleaner apparatus 100 is comprised of a cleaner case 102, a cover 103 closing an upper opening of the cleaner case 102, and a cleaner element 101 enclosed by the case 102 and the cover 103.

The cleaner case 102 has a tongue part 107 designed to be hooked onto a support pin 104, a claw part 108 designed to be hooked on a claw hooking part 105, and a seal holding member 109 that bites into a seal member 106 to thereby provide seal between the cover 103 and the cleaner case 102.

With this arrangement, air within the air cleaner apparatus 100 is filtered by the cleaner element 101 and fed through an opening 111 to the engine.

Referring now to FIG. 5, an operation of the air cleaner apparatus 100 will be described next. For attachment of the cover 103, the tongue part 107 is brought into engagement with the support pin 104, as shown by arrow (1). Then, as shown by arrow (2), the claw part 108 is lowered until it passes through the claw hooking part 105 and hooked on the latter.

The air cleaner apparatus 100 shown in FIGS. 4 and 5 is of the type in which the cover 103 is secured to the cleaner case 102 by means of the claw part 108 and the claw hooking part 105.

Apart from this type of air cleaner apparatus, there is an air cleaner apparatus of another type in which attachment is effected by means of a bolt and a nut, as shown in FIG. 6. In the air cleaner apparatus 120 of FIG. 6, a cleaner case 121 has a support pin 104 at one end and a nut 122 at an opposite end. The cover 123 has a bolt hole 124 in which a bolt 125 is threadedly engaged. To sum up, in the air cleaner apparatus 120, the cover 123 is secured to the cleaner case 121 by means of the tongue part 107 and the bolt 125.

As can be appreciated from FIGS. 4 and 6, there are several different modes of attachment of cleaner covers to cleaner cases. Cleaner covers are aesthetic parts and should have an appealing appearance. End users of air cleaners may wish to replace the cleaner cover 103 of FIG. 4 with the cleaner cover 123 of FIG. 6. There has been developed no technique that can cope with such a situation.

SUMMARY OF THE INVENTION

It is therefore an object of the present invention to provide a technique that enables replacement of one cleaner cover with another cleaner cover for an air cleaner apparatus.

According to one aspect of the present invention, there is provided a cleaner cover replacing method for an air cleaner apparatus comprising: a box-shaped cleaner case opening on one side; and a first cleaner cover for being mated with the cleaner case to cover the opening of the cleaner case, the cleaner case having support pins provided on one side and claw hooking parts provided on an opposite side, the first cleaner cover having on one side tongue parts for being swingably supported on the support pins of the cleaner case and on an opposite side claw parts designed for hooking engagement with the claw hooking parts of the cleaner case, the method comprising the steps of: providing a second cleaner cover having on one side tongue parts for being swingably supported on the support pins of the cleaner case and a bolt hole on an opposite side; providing an attachment capable of detachable interlocking engagement with the claw hooking parts of the cleaner case and having a nut part at a position aligned with the bolt hole of the second cleaner cover; detaching the first cleaner cover from the cleaner case; placing the attachment into fitted engagement with the claw hooking parts of the cleaner case; placing the second cleaner cover into mated engagement with the cleaner case; and causing a bolt to pass through the bolt hole and to threadedly engage with the nut part.

In another aspect of the present invention, there is provided an attachment for use in replacing a first cleaner cover in an air cleaner including a box-shaped cleaner case opening on one side, the first cleaner cover being mated with the cleaner case to cover the opening of the cleaner case, the cleaner case having support pins on one side and a pair of U-shaped claw hooking parts on an opposite side, the first cleaner cover having on one side tongue parts swingably supported on the support pins of the cleaner case and on an opposite side claw parts placed in hooking engagement with the claw hooking parts of the cleaner case, to a second cleaner cover having on one side tongue parts for being swingably supported on the support pins of the cleaner case and a bolt hole on an opposite side, the attachment comprising: a plurality of insertion pieces designed to be fitted in the claw hooking parts of the cleaner case; a pair of jaw parts having at distal ends hooks to be hooked onto an edge of the respective claw hooking parts; a support part for supporting the insertion pieces and the claw parts; and a nut part provided on the support part so as to be aligned with the bolt hole of the second cleaner cover.

By virtue of the attachment, replacement of the first cleaner cover with the second cleaner cover can be accomplished easily and swiftly. Additionally, owing to the attachment, change of one cleaner cover to another which have different modes of attachment is enabled. As a result, increased air cleaner usability is provided.

Preferably, the insertion pieces are grouped into two each having the plurality of insertion pieces extending from the support part and engaged in the respective U-shaped claw hooking part.

BRIEF DESCRIPTION OF THE DRAWINGS

Certain preferred embodiments of the present invention will be described in detail below, by way of example only, with the reference to the accompanying drawings, in which.

DETAILED DESCRIPTION OF THE PREFERRED EMBODIMENTS

Figure 1A:
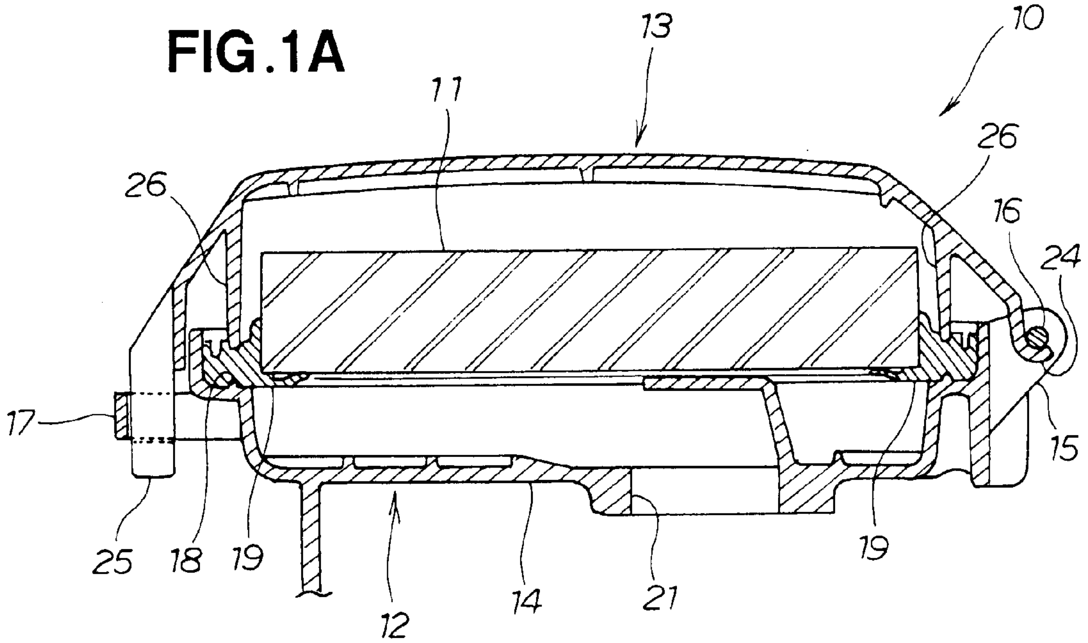
FIG. 1A is a cross-sectional view showing an air cleaner apparatus according to the present invention.
Figure 1B:
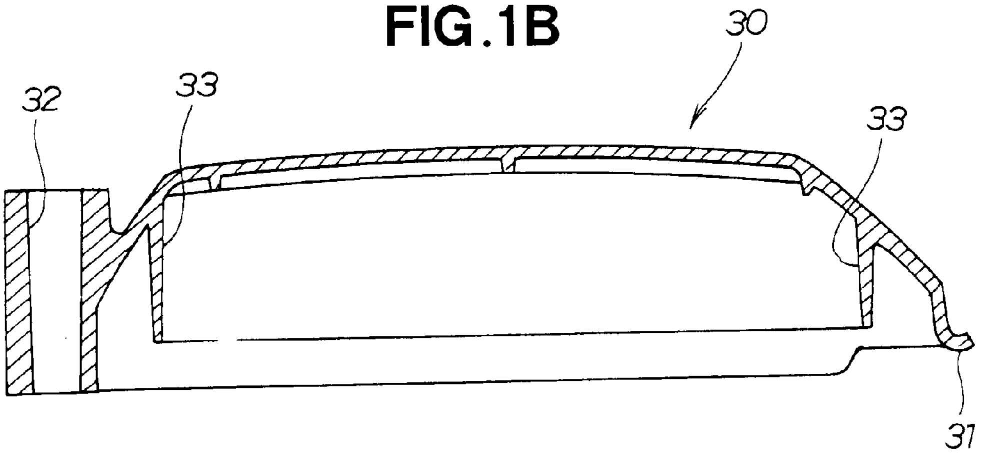
FIG. 1B is a cross-sectional view showing a replacement cover to replace the cover of FIG. 1A.

Reference is initially made to FIG. 1A showing an air cleaner apparatus 10 having a first or original cover 13, and to FIG. 1B showing a second or replacement cover 30 for replacing the original cover.

As shown in FIG. 1A, the air cleaner apparatus 10 is comprised of a box-shaped cleaner case 12 for accommodating a cleaner element 11, and the cover 13 covering an opening of the cleaner case 12.

The cleaner case 12 comprises a base part 14, brim parts 15 provided at a right end of the base part 14, support pins 16 provided at the brim parts 15 for swingably supporting the first cover 13, U-shaped hooks 17 provided at locations opposite from the support pins 16, a sealing member 19 for supporting the cleaner element 11 with an inner peripheral surface thereof, and a hole 21 formed through an undersurface of the base part 14 for allowing passage of air filtrated by the cleaner element 11. Designated by reference numeral 18 is a projection for preventing displacement of the sealing member 19. The sealing member 19 is shown as a part of the cleaner case 12 but may be an independent member.

The first or original cover 13 is comprised of tongue parts 24 provided at a right end thereof and hooked onto the respective support pins 16, claw parts 25 (only one shown) provided at an opposite end thereof and interlocked with the U-shaped hooks 17, and a sealing member holding part 26 biting into the sealing member 19 to thereby provide sealing between the base part 14 and the first cover 13.

The first cover 13 is detachable from the cleaner case 12. For detaching the first cover 13 from the cleaner case 12, the claw parts 25 are pressed in a direction away from the Figure to be released from hooks 17. Then, the first cover 13 is lifted to a predetermined height. Finally, the tongue parts 24 are released from the support pins 16 to thereby complete detachment of the first cover 13 from the cleaner case 12.

As shown in FIG. 1B, the second or replacement cover 30 is comprised of a tongue part 31 located at a right end and hooked onto the respective support pins 16, a bolt hole 32 located at a left end and designed to receive a bolt to be discussed in detail below, and a sealing member holding part 33 biting into a sealing member 19 to thereby provide sealing between the base part 14 and the second cover 30.

Figure 2:
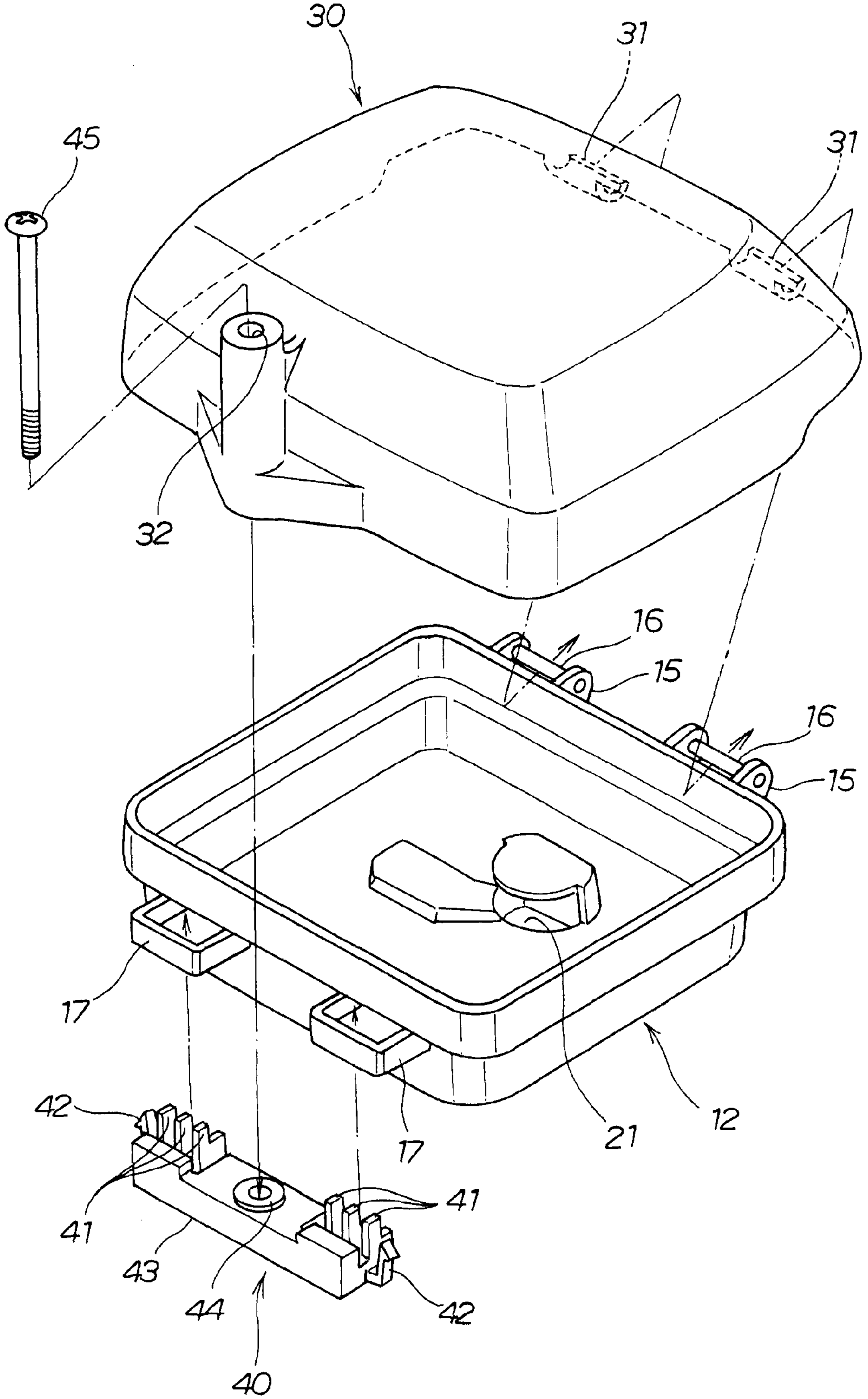
FIG. 2 is an exploded view of the air cleaner apparatus, illustrating a mode of attachment of the replacement cover.

In accordance with the present invention, the thus-arranged second cover 30 can be attached to the cleaner case 12 in place of the original cover 13. A mode of attachment or replacement of the second cover 30 will be explained next with reference to FIG. 2 wherein the cleaner element 11 and the sealing member 19 are removed for clarity.

For attachment of the second cover 30, an attachment 40 is provided. The attachment 40 is comprised of a plurality of insertion pieces 41 designed to be inserted into the U-shaped hooks 17, 17, right and left jaw parts 42, 42 having at distal ends hooks to be hooked onto the U-shaped hooks 17, 17, and a support part 43 for supporting the jaw parts 42, 42 and the insertion pieces 41 thereon, with a nut part 44 formed at a position corresponding to the bolt hole 32 of the second cover 30.

The attachment 40 may desirably formed of a synthetic resin so that it may be formed easily and light in weight.

The nut part 44 may desirably be formed integrally with support part 43. Alternatively, the nut part 44 may be formed in the support part 43 by making a hole in the latter so that a nut can be fitted therein.

After provision of the attachment 40, the first cover 13 is detached in the manner described in relation to FIGS. 1A and 1B. Then, the attachment 40 is press-fitted into the U hooks 17, 17 from below. Press-fitting of the attachment 40 causes the jaw parts 42, 42 to warp toward the insertion pieces 41 and then to be hooked onto or lockingly engaged with the hooks 17, 17. The attachment 40 is attached to the U hooks 17, 17 in this manner.

For each hook 17, the insertion pieces 41 extend from the support part 43 as a group and engage with the hook 17 as the group. By thus causing the insertion pieces 41 to contact at many points with the cleaner case 12, the attachment 40 can be firmly secured to the cleaner case 12

Next, the tongue parts 31, 31 of the second cover 30 are brought into engagement with the support pins 16, 16. Then, the second cover 30 is placed on the cleaner case 12. At this time, the bolt hole 32 is aligned with the nut part 44.

Figure 3:
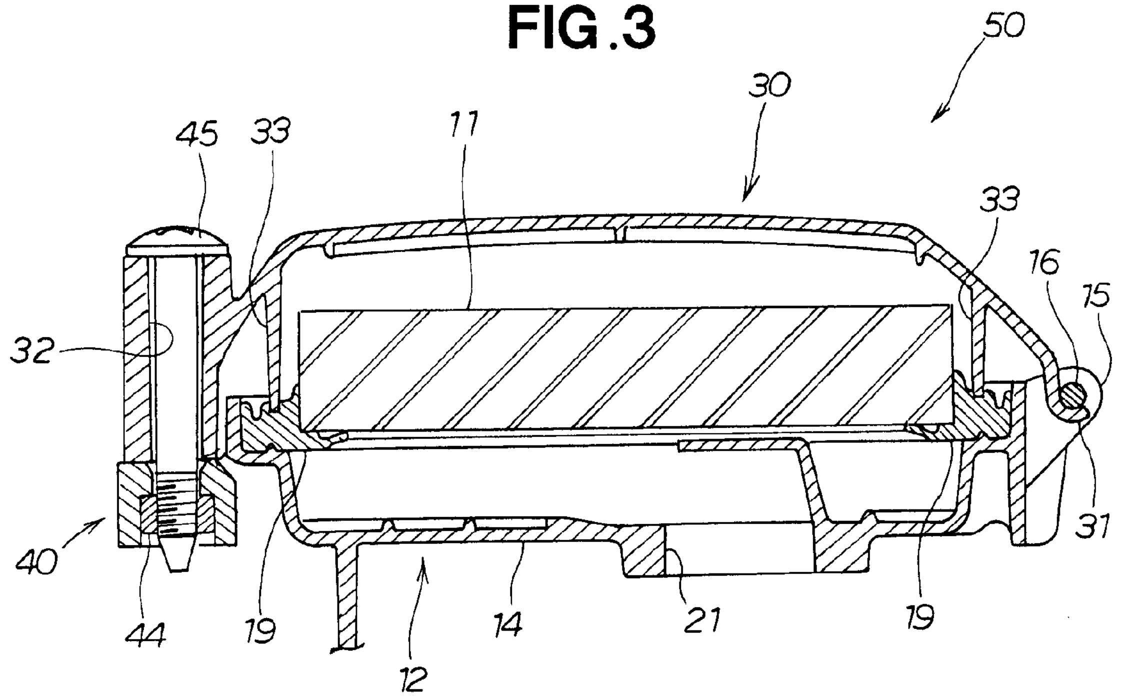
FIG. 3 is a cross-sectional view showing the air cleaner apparatus with the replacement cover attached.
Figure 4:
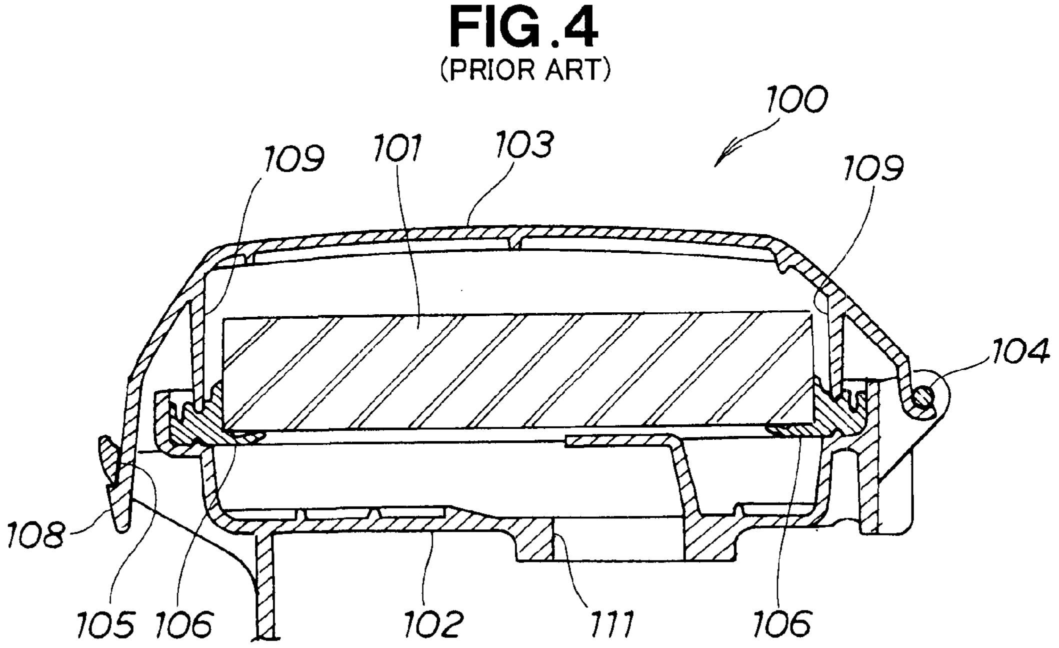
FIG.4 (PRIOR ART)
FIG. 4 is a cross-sectional view showing a conventional air cleaner apparatus.
Figure 5:
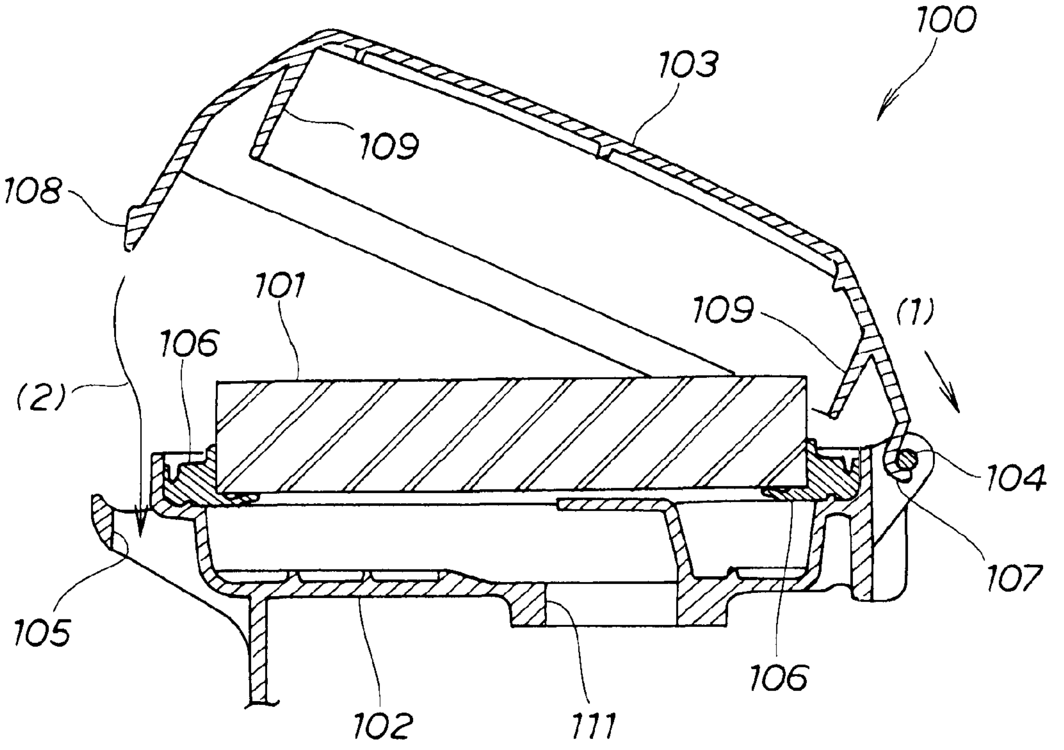
FIG.5 (PRIOR ART)
FIG. 5 is a cross-sectional view showing an operation of the air cleaner apparatus of FIG. 4.
Figure 6:
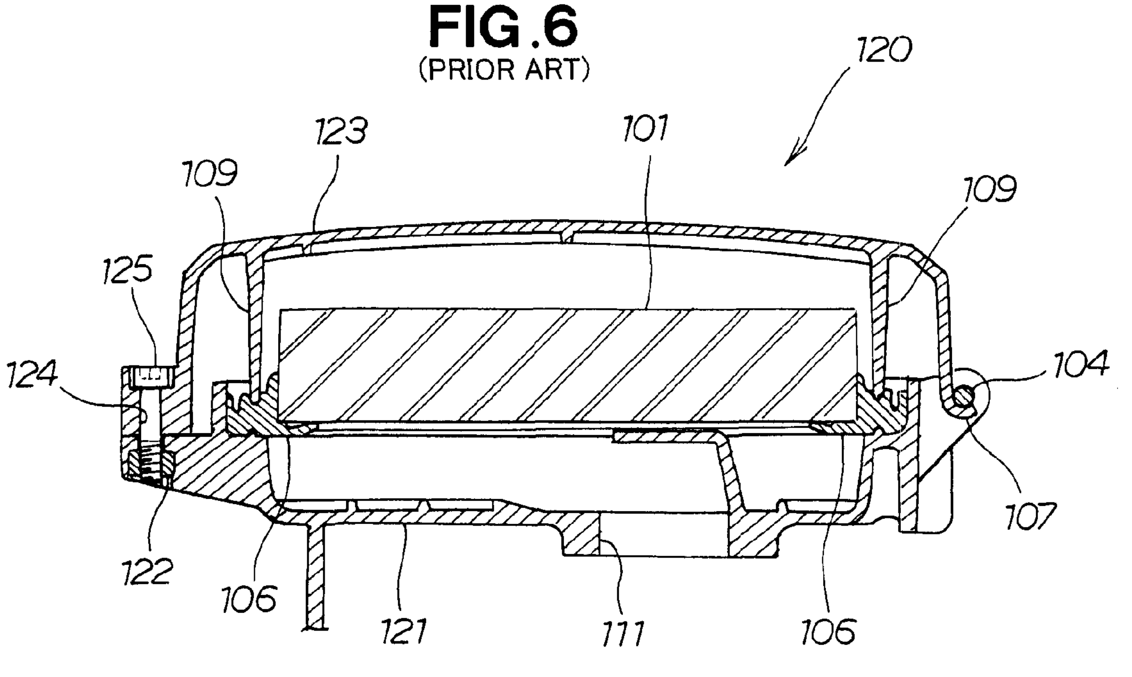
FIG.6 (PRIOR ART)
FIG. 6 is a separate conventional air cleaner apparatus.

Finally, a bolt 45 is threadedly engaged in the nut part 44 as shown in FIG. 3. This completes the mounting of the second cover 30 to thereby provide an air cleaner 50. As is now clear from the foregoing discussion, the second cover 30 is secured to the cleaner case 12 by means of the tongue parts 31, bolt 45 and the attachment 40.

For attaching the first cover 13 to the cleaner case 12 again, the above-described processes should be followed backwardly. Namely, the bolt 45 is released from the nut part 44 and bolt hole 32. Then, the second cover 30 is lifted to a predetermined height. Thereafter, the tongue parts 31 are detached from the support pins 16 to thereby release the second cover 30 from the cleaner case 12. Finally, the jaw parts 42 are pressed toward the nut part 44 to thereby release the attachment 40 from the cleaner case 12, followed by attaching the first cover to the case 12.

Use of the attachment 40 enables replacement of the first cover 13 with the second cover 30. Since the first cover 13 and the second cover 30 that have different modes of attachment can be attached to the one and same cleaner case 12, air cleaners are rendered versatile and useful.

Although plural insertion pieces may desirably be provided to ensure firm attachment of the attachment to the cleaner case, a single insertion piece may also achieve the object of the present invention.

Obviously, various minor changes and modifications of the present invention are possible in light of the above teaching. It is therefore to be understood that within the scope of the appended claims the invention may be practiced otherwise than as specifically described.

What is claimed is:

1. A cleaner cover replacing method for an air cleaner apparatus comprising: a box-shaped cleaner case opening on one side; and a first cleaner cover for being mated with the cleaner case to cover the opening of the cleaner case, the cleaner case having support pins provided on one side and claw hooking parts provided on an opposite side, the first cleaner cover having on one side tongue parts for being swingably supported on the support pins of the cleaner case and on an opposite side claw parts designed for hooking engagement with the claw hooking parts of the cleaner case, the method comprising the steps of:

providing a second cleaner cover having on one side tongue parts for being swingably supported on the support pins of the cleaner case and a bolt hole on an opposite side;

providing an attachment capable of detachable interlocking engagement with the claw hooking parts of the cleaner case and having a nut part at a position aligned with the bolt hole of the second cleaner cover;

detaching the first cleaner cover from the cleaner case;

placing the attachment into fitted engagement with the claw hooking parts of the cleaner case;

placing the second cleaner cover into mated engagement with the cleaner case; and causing a bolt to pass through the bolt hole and to threadedly engage with the nut part.

2. An attachment for use in replacing a first cleaner cover in an air cleaner including a box-shaped cleaner case opening on one side, the first cleaner cover being mated with the cleaner case to cover the opening of the cleaner case, the cleaner case having support pins on one side and a pair of U-shaped claw hooking parts on an opposite side, the first cleaner cover having on one side tongue parts swingably supported on the support pins of the cleaner case and on an opposite side claw parts placed in hooking engagement with the claw hooking parts of the cleaner case, to a second cleaner cover having on one side tongue parts for being swingably supported on the support pins of the cleaner case and a bolt hole on an opposite side, the attachment comprising:

a plurality of insertion pieces designed to be fitted in the claw hooking parts of the cleaner case;

a pair of jaw parts having at distal ends hooks to be hooked onto an edge of the respective claw hooking parts;

a support part for supporting the insertion pieces and the claw parts; and a nut part provided on the support part so as to be aligned with the bolt hole of the second cleaner cover.

3. The attachment of claim 2, wherein the insertion pieces are grouped into two, each group having the plurality of insertion pieces extending from the support part and engaged in the respective U-shaped claw hooking part.

* * * * *